United States Patent
Kojukhov et al.

(10) Patent No.: US 11,477,827 B2
(45) Date of Patent: Oct. 18, 2022

(54) SYSTEM, METHOD, AND COMPUTER PROGRAM FOR USER EQUIPMENT HANDLING IN A 5G NETWORK BASED ON AVAILABLE RESOURCES

(71) Applicant: Amdocs Development Limited, Limassol (CY)

(72) Inventors: Andrei Kojukhov, Rishon le Zion (IL); Alla Goldner, Tel Aviv (IL); Tzvika Naveh, Herzeliya (IL); Avi Chapnick, Ramat Gan (IL); Borislav Glozman, Ramat Gan (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 17/196,791

(22) Filed: Mar. 9, 2021

(65) Prior Publication Data
US 2022/0295578 A1    Sep. 15, 2022

(51) Int. Cl.
*H04W 76/11* (2018.01)
*H04W 72/04* (2009.01)

(52) U.S. Cl.
CPC .......... *H04W 76/11* (2018.02); *H04W 72/044* (2013.01)

(58) Field of Classification Search
CPC ............................ H04W 76/11; H04W 72/044
See application file for complete search history.

(56) References Cited

U.S. PATENT DOCUMENTS

| | | | |
|---|---|---|---|
| 8,745,239 B2 | 6/2014 | Thibeault et al. | |
| 10,785,634 B1 | 9/2020 | Fiorese et al. | |
| 10,893,097 B1 | 1/2021 | Liu et al. | |
| 2016/0156503 A1* | 6/2016 | Rosa de Sousa Teixeira | H04L 41/0668 370/216 |
| 2017/0142206 A1 | 5/2017 | Kodaypak et al. | |
| 2020/0275313 A1 | 8/2020 | He et al. | |
| 2020/0280822 A1 | 9/2020 | Stammers et al. | |
| 2020/0296653 A1 | 9/2020 | Huang | |

FOREIGN PATENT DOCUMENTS

WO    2018215046 A1    11/2018
WO    2020109853 A1    6/2020

OTHER PUBLICATIONS

International Search Report and Written Opinion from PCT Application No. PCT/IB2022/051970, dated May 27, 2022.

* cited by examiner

*Primary Examiner* — Curtis B Odom
(74) *Attorney, Agent, or Firm* — Zilka-Kotab, P.C.

(57) ABSTRACT

As described herein, a system, method, and computer program are provided for handling a user equipment connection to a 5G network. An orchestration function of the 5G network identifies a connection to be established with the 5G network by the user equipment. The orchestration function determines a data center in the 5G network having resources available for use by the user equipment. The orchestration function generates access related information to be used by the user equipment for establishing the connection with the 5G network, wherein the access related information is based in part on the data center having the resources available for use by the user equipment. The orchestration function causes the user equipment to establish the connection to the 5G network according to the access related information by communicating the necessary information to a policy control function (PCF).

20 Claims, 4 Drawing Sheets

SYSTEM, METHOD, AND COMPUTER PROGRAM FOR USER EQUIPMENT HANDLING IN A 5G NETWORK BASED ON AVAILABLE RESOURCES

FIELD OF THE INVENTION

The present invention relates to managing user equipment in a 5G network.

BACKGROUND

The new policy requirements specified in 3GPP TS 23.503 (sub-clause 4.2) for 5G systems allows non-session management related policy control. This policy control includes access and mobility related policy control requirements. In particular, the Policy Control Function (PCF) shall support interactions with the access and mobility policy enforcement in the Access and Mobility Management Function (AMF), through service-based interfaces.

The policy control also includes user equipment (UE) access selection and Protocol Data Unit (PDU) Session selection related policy (UE policy) control requirements. In particular, the 5G Core (5GC) shall be able to provide policy information from the PCF to the UE.

To date, this new non-session management related policy control has not been leveraged to improve user equipment handling in a 5G network based on available resources. There is thus a need for addressing these and/or other issues associated with the prior art.

SUMMARY

As described herein, a system, method, and computer program are provided for handling a user equipment connection to a 5G network. An orchestration function of the 5G network identifies a connection to be established with the 5G network by the user equipment. The orchestration function determines a data center in the 5G network having resources available for use by the user equipment. The orchestration function generates access related information to be used by the user equipment for establishing the connection with the 5G network, wherein the access related information is based in part on the data center having the resources available for use by the user equipment. The orchestration function causes the user equipment to establish the connection to the 5G network according to the access related information by communicating the necessary information to a policy control function (PCF).

DETAILED DESCRIPTION

Figure 1:
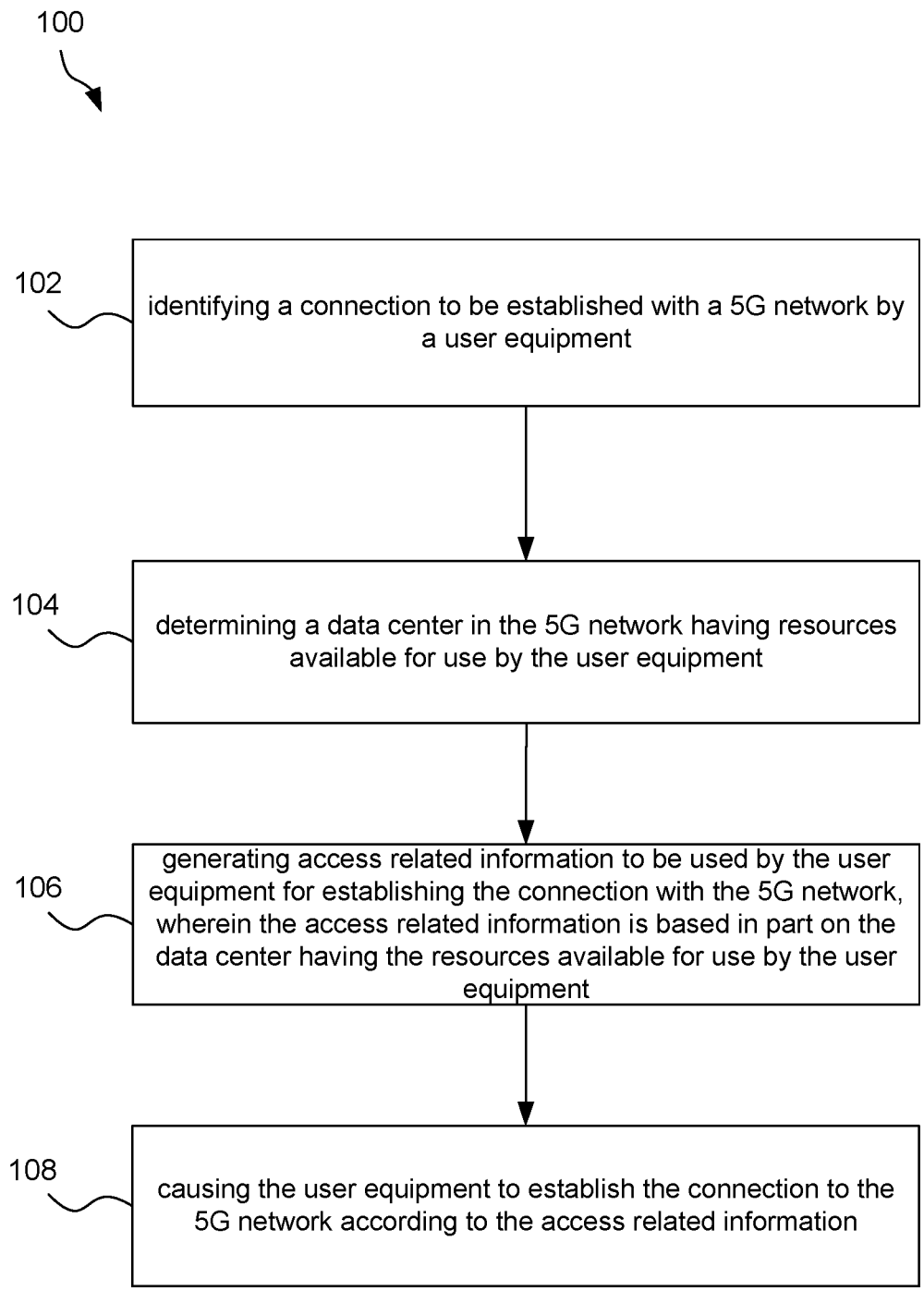
FIG. 1 illustrates a method for handling a user equipment connection to a 5G network, in accordance with one embodiment.

FIG. 1 illustrates a method 100 for handling a user equipment connection to a 5G network, in accordance with one embodiment. The method 100 is performed by an orchestration function in the 5G network. The orchestration function may be executed by any computer system within a 5G network, such as those described below with reference to FIGS. 3 and/or 4. In general, the orchestration function operates to place 5G network functions and applications (e.g. user equipment consumed applications) in data centers of the 5G network.

In operation 102, a connection to be established with the 5G network by the user equipment is identified. The user equipment may be any user owned and/or operated device with a 5G connection capability. For example, the user equipment may be a mobile phone.

The 5G network may allow mobility of the user equipment by implementing multiple automatic handovers over the 5G network. Accordingly, in one embodiment, the connection to be established with the 5G network by the user equipment may be identified as a result of a handover of the user equipment within the 5G network (i.e. from one access point to another access point). In another embodiment, the connection to be established with the 5G network by the user equipment may be identified as a result of the user equipment requesting an initial connection with the 5G network.

In operation 104, a data center in the 5G network having resources available for use by the user equipment is determined. The data center may be any computer system within the 5G network having resources available to user equipment. The resources may include applications to be consumed by the user equipment, or any other resources (e.g. services) to be made accessible to the user equipment and optionally other components within the 5G network.

Since the orchestration function operates to place 5G network functions and applications in data centers of the 5G network, as noted above, the orchestration function may have knowledge of available resources at each data center in the 5G network. In this way, the orchestration function may use this knowledge to determine one of the data centers having resources available for use by the user equipment, such as specific resources (e.g. applications) to be consumed by the user equipment.

As an option, the data center may also be determined to meet constraints of the user equipment. In other words, the data center may have resources available to the user equipment while also meeting constraints of the user equipment. The constraints may be specified in a profile defined for the user equipment and made accessible to the orchestration function. Just by way of example, the constraints may include a latency requirement and a bandwidth requirement.

In operation 106, access related information to be used by the user equipment for establishing the connection with the 5G network is generated, where the access related information is based in part on the data center having the resources available for use by the user equipment. In one embodiment, the access related information may be generated based on the placement, known by the orchestration function, of the 5G network functions and applications in the data centers of the 5G network. For example, the access related information may include an indication of an access point within the 5G network that is associated with the data center. This access point may be specified in the access related information for the purpose of being used by the user equipment to establish the connection with the 5G network.

In operation 108, the user equipment is caused to establish the connection to the 5G network according to the access related information. For example, the user equipment may be caused to connect to the 5G network through the access point specified in the access related information.

In one embodiment, the user equipment may be caused to establish the connection to the 5G network by sending, by the orchestration function to a policy control function within the 5G network, the access related information. In turn, the policy control function may interact with an access and mobility policy enforcement in an access and mobility management function of the 5G network (e.g. using service-based interfaces). The policy control function may also influence the user equipment to establish the connection to the 5G network according to the access related information. For example, the policy control function may communicate policy information to the user equipment to cause the user equipment to establish the connection to the 5G network according to the access related information.

In this way, the method 100 may be used by the orchestration function to influence a decision of the user equipment with regard to access attachment within the 5G network. As noted above, such influence may specifically be based on the available resources at data centers within the 5G network, as known by the orchestration function. The method 100 may be used for all user equipment to be connected to the 5G network, whether during an initial connection to the 5G network or a handover process within the 5G network.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
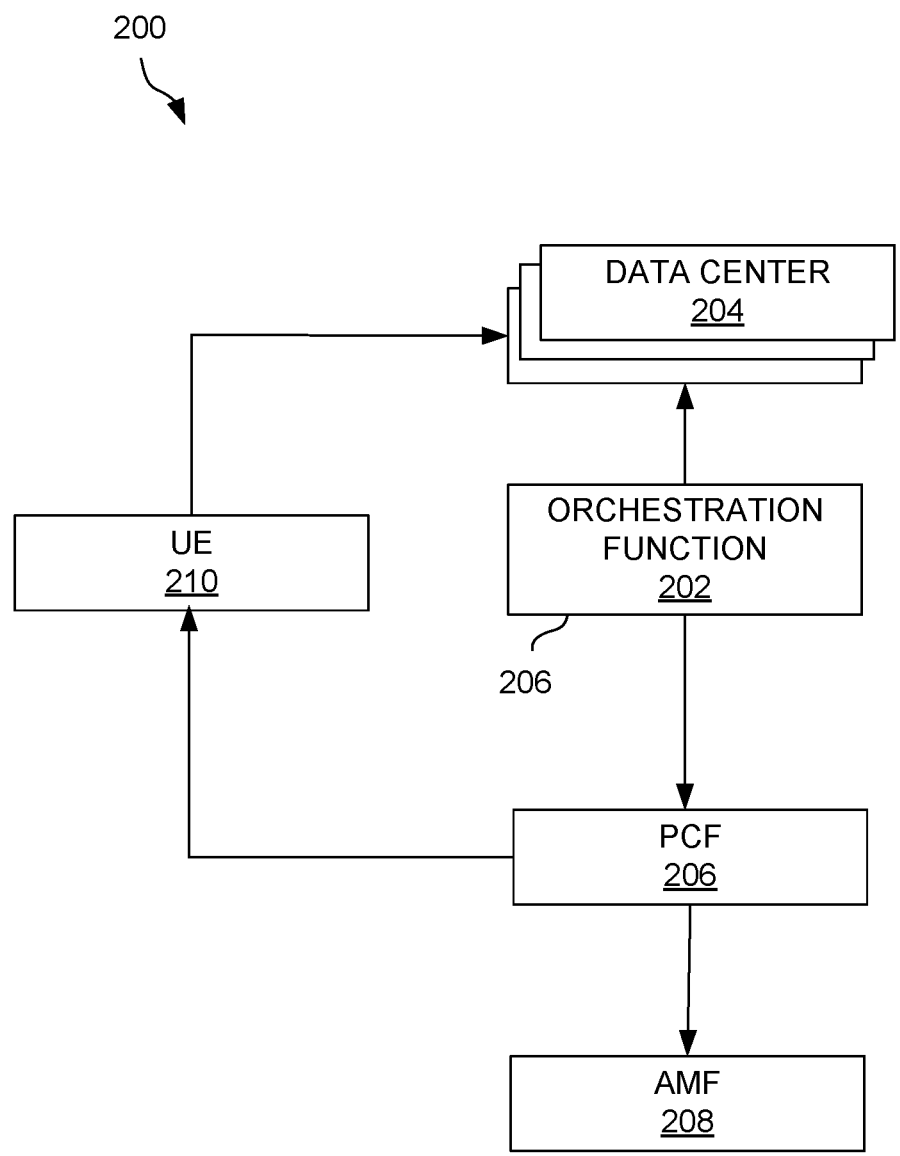
FIG. 2 illustrates a system flow diagram for handling a user equipment connection to a 5G network, in accordance with one embodiment.

FIG. 2 illustrates a system 200 flow diagram for handling a user equipment connection to a 5G network, in accordance with one embodiment. As an option, the flow diagram may be implemented in the context of the details of the previous figure and/or any subsequent figure(s). For example, the system 200 may represent components of a 5G network. Of course, however, the flow diagram may be implemented in the context of any desired environment. Further, the aforementioned definitions may equally apply to the description below.

The 5G orchestration function 202 advises a 5G PCF 206 to associate/connect the UE 210 to a specific access, such as a 3rd Generation Partnership Project (3GPP) or non-3GPP (e.g. WiFi, etc.), a specific radio access network (RAN)/core in 3GPP access, and a specific data center location within the 5G network. This is enabled by the new policy requirements specified in 3GPP TS 23.503 (sub-clause 4.2) which allows non-session management related policy control including:

(1) Access and mobility related policy control requirements—Policy Control Function (PCF) shall support interactions with the access and mobility policy enforcement in the AMF, through service-based interfaces; and (2) UE access selection and PDU Session selection related policy (UE policy) control requirements—The 5GC shall be able to provide policy information from the PCF to the UE.

The present embodiment disclosed herein promotes the value of both Network management and Orchestration functions by their interaction. The orchestration function 202 is responsible for homing and placement of 5G Network Functions and the applications consumed by the UE 210. The orchestration function 202 is in a position to know what specific location including Access Network (3GPP/non-3GPP), radio access and Data center 204 (e.g. edge, enterprise, central office) is most applicable for the UE 210 to use to connect to the 5G network. This includes the available resources in the data center 204 as well as applicable user service related constraints: latency, bandwidth, etc. defined in a User Service Profile.

The orchestration function 202 interacts with 5G PCF 206 in order to advise the PCF 206 to connect the UE 210 to a specific access associated with a select data center 204 having available resources just in time the user equipment 210 is willing to consume its applications.

The 5G PCF 206 interacts with the access and mobility policy enforcement in the 5G AMF 208 through service-based interfaces and influences the UE 210 decision to attach to a specific access by providing policy information from the PCF 206 to the UE 210.

Figure 3:
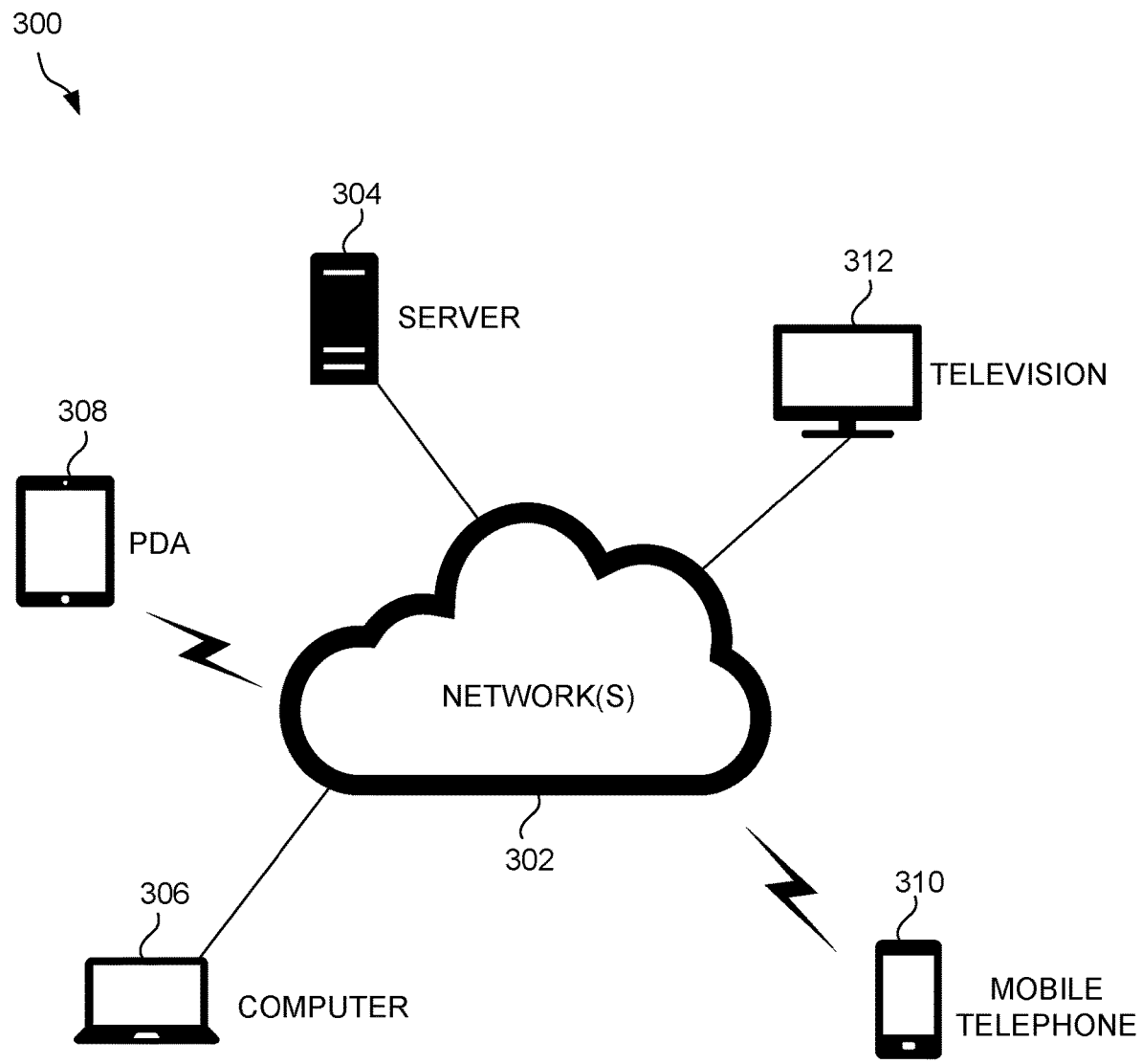
FIG. 3 illustrates a network architecture, in accordance with one possible embodiment.

FIG. 3 illustrates a network architecture 300, in accordance with one possible embodiment. As shown, at least one network 302 is provided. In the context of the present network architecture 300, the network 302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 302 may be provided.

Coupled to the network 302 is a plurality of devices. For example, a server computer 304 and an end user computer 306 may be coupled to the network 302 for communication purposes. Such end user computer 306 may include a desktop computer, lap-top computer, and/or any other type of logic. Still yet, various other devices may be coupled to the network 302 including a personal digital assistant (PDA) device 308, a mobile phone device 310, a television 312, etc.

Figure 4:
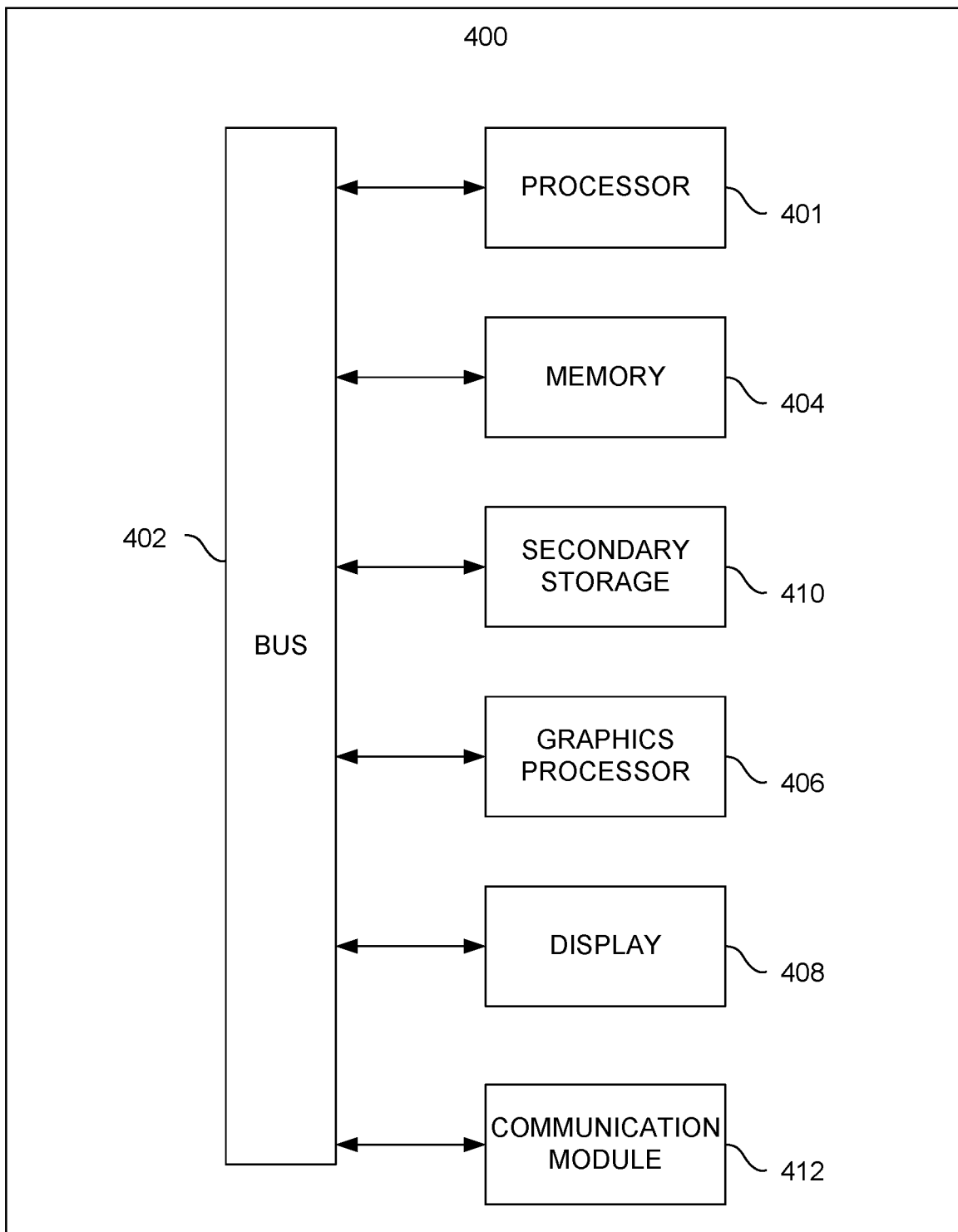
FIG. 4 illustrates an exemplary system, in accordance with one embodiment.

FIG. 4 illustrates an exemplary system 400, in accordance with one embodiment. As an option, the system 400 may be implemented in the context of any of the devices of the network architecture 300 of FIG. 3. Of course, the system 400 may be implemented in any desired environment.

As shown, a system 400 is provided including at least one central processor 401 which is connected to a communication bus 402. The system 400 also includes main memory 404 [e.g. random access memory (RAM), etc.]. The system 400 also includes a graphics processor 406 and a display 408.

The system 400 may also include a secondary storage 410. The secondary storage 410 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 404, the secondary storage 410, and/or any other memory, for that matter. Such computer programs, when executed, enable the system 400 to perform various functions (as set forth above, for example). Memory 404, storage 410 and/or any other storage are possible examples of non-transitory computer-readable media.

The system 400 may also include one or more communication modules 412. The communication module 412 may be operable to facilitate communication between the system 400 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method comprising:
   identifying, by an orchestration function of a 5G network, a connection to be established with the 5G network by a user equipment;
   determining, by the orchestration function of the 5G network, a data center in the 5G network having resources available for use by the user equipment;
   generating, by the orchestration function of the 5G network, access related information to be used by the user equipment for establishing the connection with the 5G network, wherein the access related information is based in part on the data center having the resources available for use by the user equipment; and causing, by the orchestration function of the 5G network, the user equipment to establish the connection to the 5G network according to the access related information.

2. The non-transitory computer readable medium of claim 1, wherein the orchestration function operates to place 5G network functions and applications in data centers of the 5G network.

3. The non-transitory computer readable medium of claim 2, wherein the access related information is generated based on the placement, known by the orchestration function, of the 5G network functions and applications in the data centers of the 5G network.

4. The non-transitory computer readable medium of claim 1, wherein the resources include applications to be consumed by the user equipment.

5. The non-transitory computer readable medium of claim 1, wherein the data center is further determined to meet constraints of the user equipment.

6. The non-transitory computer readable medium of claim 5, wherein the constraints are specified in a profile defined for the user equipment, the profile being accessible to the orchestration function.

7. The non-transitory computer readable medium of claim 6, wherein the constraints of the user equipment include a latency requirement and a bandwidth requirement.

8. The non-transitory computer readable medium of claim 1, wherein the access related information includes an indication of an access point within the 5G network that is associated with the data center.

9. The non-transitory computer readable medium of claim 1, wherein causing, by the orchestration function of the 5G network, the user equipment to establish the connection to the 5G network according to the access related information includes:

sending, by the orchestration function to a policy control function within the 5G network, the access related information to be used to establish the connection between the user equipment and the 5G network.

10. The non-transitory computer readable medium of claim 9, wherein the policy control function interacts with an access and mobility policy enforcement in an access and mobility management function of the 5G network.

11. The non-transitory computer readable medium of claim 10, wherein the policy control function interacts with the access and mobility policy enforcement in the access and mobility management function of the 5G network using service-based interfaces.

12. The non-transitory computer readable medium of claim 10, wherein the policy control function influences the user equipment to establish the connection to the 5G network according to the access related information.

13. The non-transitory computer readable medium of claim 10, wherein the policy control function communicates policy information to the user equipment to cause the user equipment to establish the connection to the 5G network according to the access related information.

14. A method, comprising:

identifying, by an orchestration function of a 5G network, a connection to be established with the 5G network by a user equipment;

determining, by the orchestration function of the 5G network, a data center in the 5G network having resources available for use by the user equipment;

generating, by the orchestration function of the 5G network, access related information to be used by the user equipment for establishing the connection with the 5G network, wherein the access related information is based in part on the data center having the resources available for use by the user equipment; and causing, by the orchestration function of the 5G network, the user equipment to establish the connection to the 5G network according to the access related information.

15. The method of claim 14, wherein the orchestration function operates to place 5G network functions and applications in data centers of the 5G network.

16. The method of claim 15, wherein the access related information is generated based on the placement, known by the orchestration function, of the 5G network functions and applications in the data centers of the 5G network.

17. The method of claim 14, wherein the resources include applications to be consumed by the user equipment.

18. The method of claim 14, wherein the data center is further determined to meet constraints of the user equipment.

19. The method of claim 14, wherein causing, by the orchestration function of the 5G network, the user equipment to establish the connection to the 5G network according to the access related information includes:

sending, by the orchestration function to a policy control function within the 5G network, the access related information to be used to establish the connection between the user equipment and the 5G network.

20. A system, comprising:

a non-transitory memory storing instructions; and one or more processors in communication with the non-transitory memory that execute the instructions to perform a method comprising:

identifying, by an orchestration function of a 5G network, a connection to be established with the 5G network by a user equipment;

determining, by the orchestration function of the 5G network, a data center in the 5G network having resources available for use by the user equipment;

generating, by the orchestration function of the 5G network, access related information to be used by the user equipment for establishing the connection with the 5G network, wherein the access related information is based in part on the data center having the resources available for use by the user equipment; and causing, by the orchestration function of the 5G network, the user equipment to establish the connection to the 5G network according to the access related information.

* * * * *